United States Patent

Ichihara et al.

[11] Patent Number: 6,061,528
[45] Date of Patent: May 9, 2000

[54] FLASH DEVICE

[75] Inventors: Yoshiro Ichihara, Yokohama; Yukio Odaka, Kawasaki, both of Japan

[73] Assignee: Canon Kabushiki Kaisha, Tokyo, Japan

[21] Appl. No.: 09/070,390

[22] Filed: Apr. 30, 1998

[30] Foreign Application Priority Data

May 8, 1997 [JP] Japan ................................ 9-132991
May 30, 1997 [JP] Japan ................................ 9-156185

[51] Int. Cl.[7] .................................................. G03B 7/26
[52] U.S. Cl. ........................................ 396/205; 396/206
[58] Field of Search ................................ 396/205, 206, 396/203

[56] References Cited

U.S. PATENT DOCUMENTS

| | | | |
|---|---|---|---|
| 3,688,659 | 9/1972 | Takishima et al. | 396/203 |
| 4,068,150 | 1/1978 | Iwata et al. | 396/206 |
| 4,074,170 | 2/1978 | Orban | 396/205 |
| 4,258,297 | 3/1981 | Nakajima | 396/203 |
| 5,587,644 | 12/1996 | Masaki | 396/205 |
| 5,678,077 | 10/1997 | Ichikawa et al. | 396/205 |
| 5,713,055 | 1/1998 | Lawther et al. | 396/206 |

*Primary Examiner*—Russell Adams
*Attorney, Agent, or Firm*—Robin, Blecker & Daley

[57] ABSTRACT

In a flash device of the kind preventing a main capacitor from being overcharged by inhibiting a charging action on the main capacitor when the voltage of the main capacitor reaches a predetermined first level, detecting the voltage of the main capacitor by a voltage reference diode and allowing light emission when the voltage of the main capacitor reaches a second level which is higher than the first level, an element having a negative temperature characteristic is connected in series to the voltage reference diode. The arrangement ensures an apposite operation of the flash device irrespective of temperature variations.

22 Claims, 15 Drawing Sheets

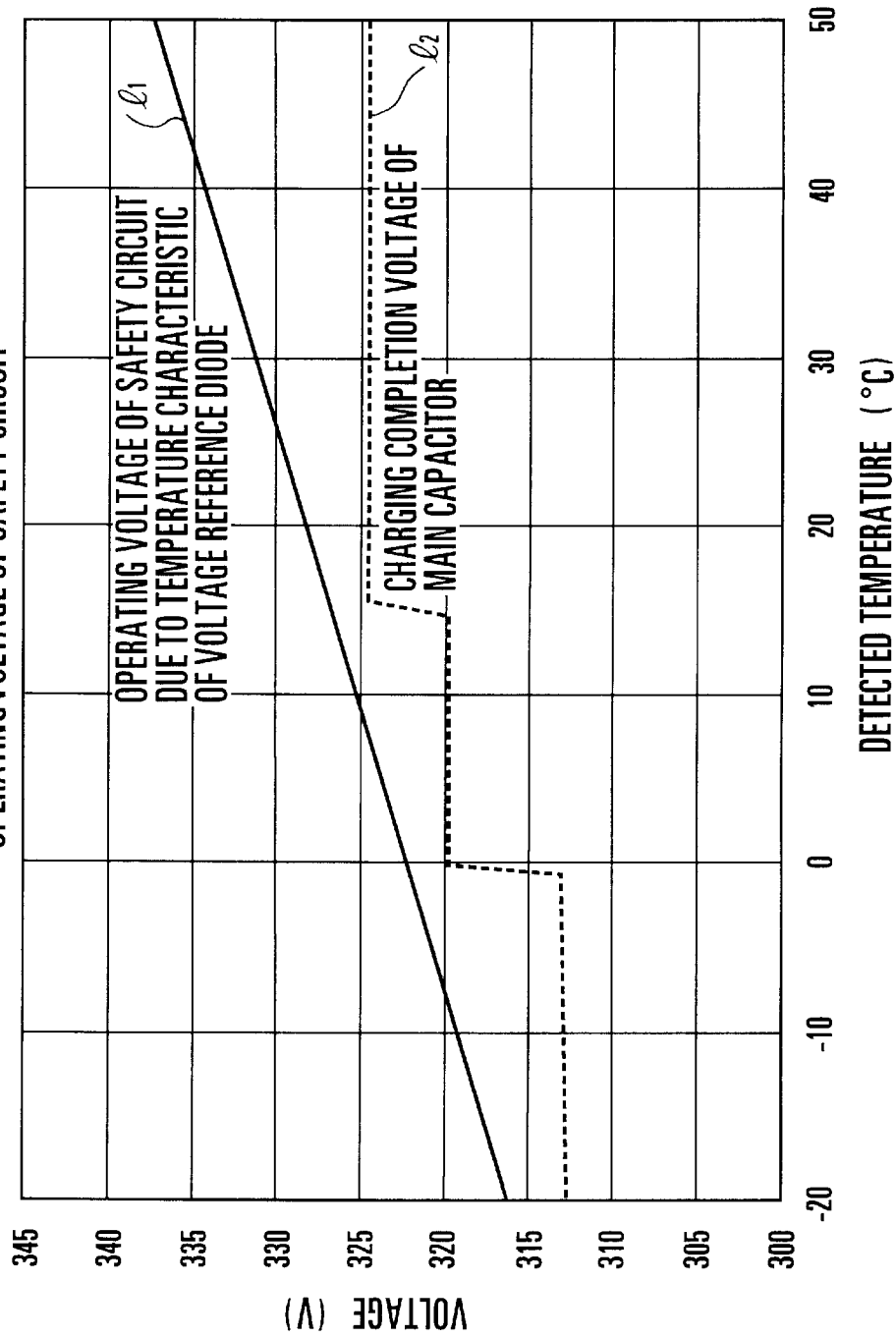

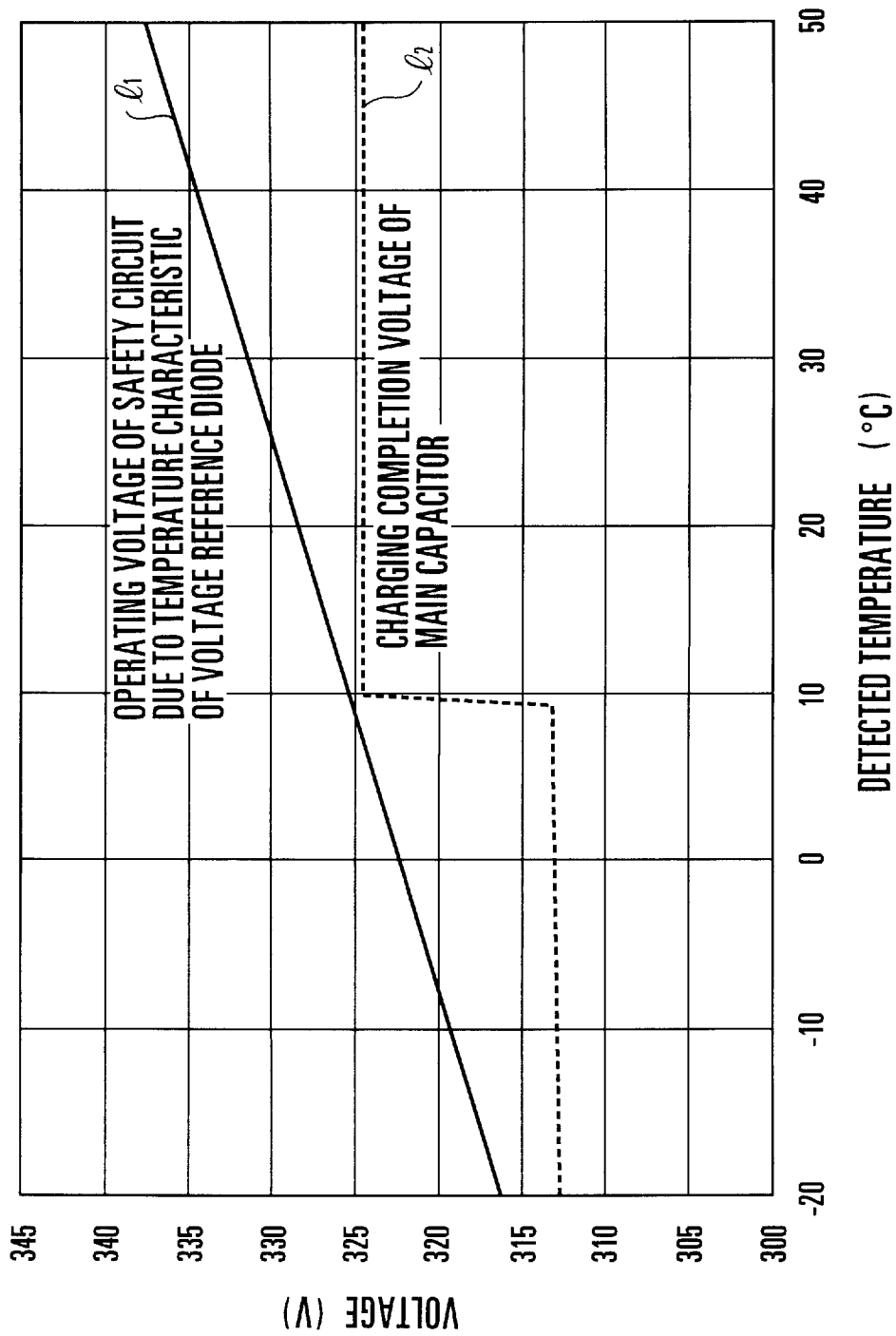

FLASH DEVICE

BACKGROUND OF THE INVENTION

1. Field of the Invention

The present invention relates to an electronic flash device arranged to prevent a main capacitor thereof from being overcharged.

2. Description of Related Art

According to the conventional arrangement of an electronic flash device, when a main capacitor happens to be overcharged beyond a charging completion voltage because of an abnormal operation occurring by some reason (for example, in a case where a control signal line is disconnected by external impact), the main capacitor which is an aluminum electrolytic capacitor generates a gas, which then causes an explosion proof valve to act to release the gas to ensure no further trouble.

However, the generation of gas tends to give a disagreeable feeling to the operator. Besides, in some cases, the operator might use the flash device without noticing a malfunction resulting from overcharging. In view of this, it has been developed to cause the main capacitor to discharge its electric charge by forcibly causing light emission when the main capacitor is overcharged, i.e., when the voltage of the main capacitor reaches a rated voltage thereof. To detect such an overcharged state, a series circuit composed of a Zener diode and a resistor is connected in parallel with the main capacitor and the gate of a trigger thyristor is connected to the cathode side of the Zener diode in such a way as to forcibly trigger the light emission when the electric charge of the main capacitor reaches the rated voltage.

FIG. 8 shows by way of example the conventional circuit arrangement of a flash device. Referring to FIG. 8, a boosting circuit 2000 is connected to a battery 1000 to boost a battery voltage. A voltage detecting circuit 3000 is arranged as a voltage detecting means for detecting the charging voltage of a main capacitor 4000. A forcible light emission circuit 5000 is arranged to forcibly cause light emission when the voltage of the main capacitor 4000 reaches a rated voltage. A Zener diode 5001 has its cathode connected to the anode of the main capacitor 4000 and its anode connected to one end of a resistor 5002. The other end of the resistor 5002 is connected to a gate of a thyristor 7000 and one end of a resistor 5003. The other end of the resistor 5003 is connected to a cathode of the main capacitor 4000. The other end of the resistor 5002 is also connected to one end of a resistor 11000. The other end of the resistor 11000 is connected to a control circuit 12000.

A resistor 6000 has its one end connected to the anode of the main capacitor 4000 and the other end to the anode of the thyristor 7000. The thyristor 7000 is provided for light emission and has its cathode connected to the cathode of the main capacitor 4000. To the anode of the thyristor 7000 is connected one end of a trigger capacitor 8000. The other end of the trigger capacitor 8000 is connected to the primary side of a trigger transformer 9000. A xenon tube 10000 is connected to the two ends of the main capacitor 4000. The control circuit 12000 includes a microcomputer and is arranged to control the input and output of an oscillation start signal C1, a charging voltage detection signal C2 and a trigger signal C3. A flash-device charging start switch 13000 is connected to the control circuit 12000.

The conventional circuit arrangement described above operates as follows. When the flash-device charging start switch 13000 is turned on, the oscillation start signal C1 turns on to cause the boosting circuit 2000 to perform a voltage boosting action for charging the main capacitor 4000. The voltage detecting circuit 3000 then detects the charging voltage of the main capacitor 4000 and generates the charging voltage detection signal C2. Then, the control circuit 12000 confirms completion of charging through the charging voltage detection signal C2. Upon confirmation of the completion of charging, the control circuit 12000 turns off the oscillation start signal C1 to bring the charging process to a stop. In the event of detachment of the terminal of the charge voltage detection signal C2, however, the charging process does not come to a stop. Under such a condition, when the charging voltage comes near to the rated voltage, the Zener diode 5001 which is set at a voltage level lower than the rated voltage turns on to turn on the gate of the thyristor 7000 through the resistor 5002. With the gate of the thyristor 7000 turned on, the electric charge of the trigger capacitor 8000 is discharged to generate pulses. Then, secondary pulses are generated by the trigger transformer 9000 to trigger and forcibly cause the xenon tube 10000 to emit light.

BRIEF SUMMARY OF THE INVENTION

It is an object of the invention to provide a flash-device protection circuit which is arranged to be capable of preventing erroneous light emission by means of a circuit for protecting a main capacitor.

Under the above object, in accordance with an aspect of the invention, there is provided an electronic flash device having a flash discharge tube, a main capacitor which supplies light emission energy to the flash discharge tube, boosting means for performing a boosting action to charge the main capacitor, and charging voltage detecting means for detecting a charging voltage of the main capacitor, wherein a series circuit composed of a voltage reference diode and a thermo-sensitive element of negative temperature characteristic is connected in parallel with the main capacitor, and light emission is triggered and caused when the charging voltage of the main capacitor has reached a voltage determined by the series circuit.

In accordance with another aspect of the invention, there is provided a flash device having a boosting circuit arranged to boost a battery voltage, a main capacitor arranged to be charged with an output of the boosting circuit, a voltage detecting circuit arranged to detect a voltage of the main capacitor, a safety circuit arranged to prevent any overvoltage from being applied to the main capacitor on the basis of the detected voltage of the main capacitor, and a temperature detecting circuit, wherein there are set a first voltage level at which the voltage of the main capacitor is held by causing the boosting circuit to be inhibited from working or to be allowed to intermittently work in accordance with the voltage of the main capacitor detected by the voltage detecting circuit and a second voltage level which is an operating voltage level of the safety circuit for discharging the main capacitor by causing light emission with a voltage applied to the main capacitor on the basis of the detected voltage of the main capacitor, and the first voltage level is variably set to be lower than the second voltage level in accordance with an output of the temperature detecting circuit.

The above and other objects and features of the invention will become apparent from the following detailed description of embodiments thereof taken in connection with the accompanying drawings.

BRIEF DESCRIPTION OF THE SEVERAL VIEWS OF THE DRAWING

FIG. 14 is a graph showing a relation between the charging voltage of a main capacitor and the operating voltage of a safety circuit in a flash device according to a fourth embodiment of the invention.

FIG. 15 is a graph showing a relation between the charging voltage of a main capacitor and the operating voltage of a safety circuit in a flash device according to a fifth embodiment of the invention.

DETAILED DESCRIPTION OF THE INVENTION

Hereinafter, preferred embodiment of the invention will be described in detail with reference to the drawings.

Figure 1:
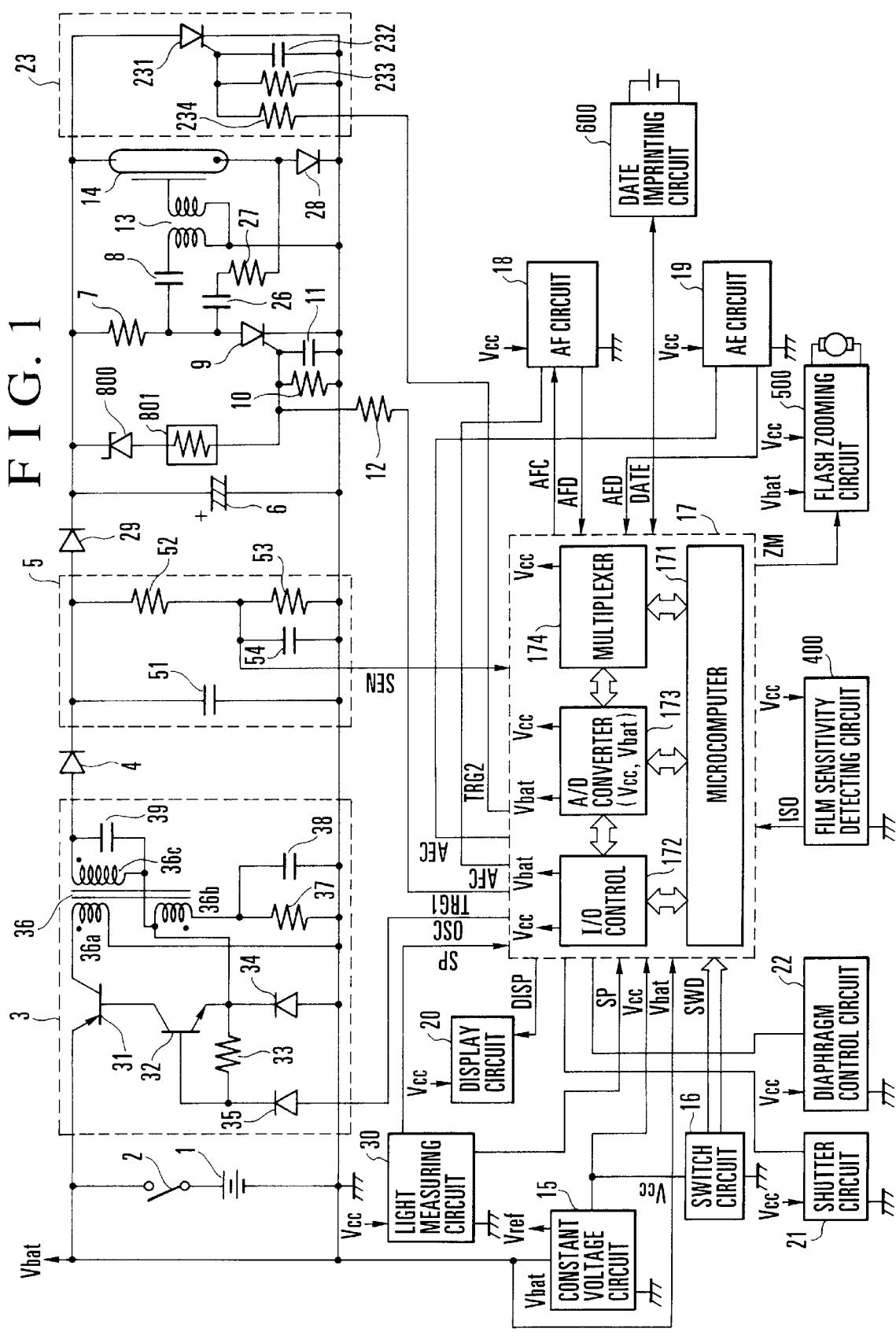
FIG. 1 is a circuit block diagram showing the circuit arrangement of a flash device for a camera according to a first embodiment of the invention.

FIG. 1 is a circuit block diagram showing a first embodiment of the invention.

Referring to FIG. 1, a battery 1 is employed as a power source. A switch 2 is connected to the battery 1 and arranged to be used for controlling supply of power to a load. A boosting circuit 3 is arranged to boost the voltage of the battery 1. An oscillation transistor 31 which is a PNP transistor has its emitter connected to the battery 1 through the switch 2. An NPN transistor 32 has its collector connected to the base of the PNP transistor 31 and is arranged to control the commencement of oscillation. A resistor 33 is connected between the base and the emitter of the NPN transistor 32. A diode 34 has its cathode connected to the emitter of the NPN transistor 32 and its anode connected to the ground. A diode 35 has its cathode connected to the base of the NPN transistor 32 and its anode to a one-chip microcomputer 17 which will be described later. A transformer 36 for oscillation and boosting has its primary winding 36a connected to the collector of the PNP transistor 31, one end of its feedback winding 36b connected to the emitter of the NPN transistor 32, the other end of the feedback winding 36b connected to a resistor 37, and its secondary winding 36c connected to the anode of a diode 4. The resistor 37 has its one end connected to the feedback winding 36b of the oscillation transformer 36 and the other end connected to the ground. A capacitor 38 is connected to the two ends of the resistor 37. A capacitor 39 is connected to the secondary winding 36c of the oscillation transformer 36. Thus, the boosting circuit 3 is composed of the above-stated elements 31 to 39.

The high tension rectifying diode 4 has its anode connected to the secondary winding 36c of the oscillation transformer 36 and its cathode connected to a voltage detecting circuit 5. The voltage detecting circuit 5 is arranged to detect the voltage of a main capacitor 6 and to send a charging voltage signal (indicating a divided voltage in proportion to an actual voltage) to the one-chip microcomputer 17. Reference numeral 51 denotes a capacitor. Resistors 52 and 53 are arranged to divide the charging voltage of the main capacitor 6. The resistor 52 is connected to the cathode of the diode 4 and also to the capacitor 51. The resistor 53 has its one end connected to the resistor 52 and the other end connected to the ground. A signal obtained by dividing the voltage of the main capacitor 6 is inputted as a signal SEN to the one-chip microcomputer 17, i.e., to an A/D converter disposed within the microcomputer 17. A capacitor 54 is connected to the two ends of the resistor 53. Thus, the voltage detecting circuit 5 is composed of the above-stated elements 51 to 54. A diode 29 has its anode connected to the voltage detecting circuit 5 and its cathode connected to the main capacitor 6. Accordingly, the voltage detecting circuit 5 is arranged to act as a charging voltage detecting means for the main capacitor 6.

The main capacitor 6 is arranged to be charged with electric energy necessary for flash emission. A resistor 7 is connected to the positive pole of the main capacitor 6. A triggering capacitor 8 is connected to the resistor 7. A light emission thyristor 9 which is provided for the commencement of light emission has its anode connected to the resistor 7 and one end of the capacitor 8 and its cathode connected to the ground. A resistor 10 and a capacitor 11 are both connected between the gate and the cathode of the thyristor 9.

A resistor 12 has its one end connected to the gate of the thyristor 9 and the other end connected to the one-chip microcomputer 17. A pulse signal TRG1 is outputted from the one-chip microcomputer 17 to turn on and trigger the gate of the thyristor 9 as a light emission start signal. A trigger transformer 13 has its primary winding connected to the other end of the trigger capacitor 8 and its secondary winding connected to a flash discharge tube 14. The flash discharge tube 14 which is provided for light emission has its anode connected to the positive pole of the main capacitor 6 and one end of the resistor 7 and its cathode connected to the anode of a diode 28.

A light emission trigger is applied to the flash discharge tube 14 by boosting the voltage of the battery 1 with the boosting circuit 3 to charge the trigger capacitor 8 through the resistor 7, turning on the thyristor 9 with the signal TRG1 to discharge the electric charge of the capacitor 8 and thus generating pulses at the primary winding of the trigger transformer 13 to generate high-voltage pulses at the secondary winding of the trigger transformer 13. A capacitor 26 has its one end connected to one end of the resistor 7 and the anode of the thyristor 9. A resistor 27 has its one end connected to the capacitor 26 and other end connected to the cathode of the flash discharge tube 14. The diode 28 has its anode connected to the cathode of the flash discharge tube 14 and its cathode connected to the ground. Thus, a double voltage circuit is formed with the elements 26 to 28.

A constant voltage circuit 15 is arranged in a known manner to output a constant voltage Vcc even when the voltage of the battery 1 varies. A switch circuit 16 is provided for controlling the camera. The one-chip microcomputer 17 is a microcomputer-incorporating one-chip IC composed of a CPU, a ROM and a RAM (171), an I/O (input/output) control circuit 172, an A/D converter 173, a multiplexer 174, etc., and is arranged to control the camera system by software. The constant voltage output Vcc is connected as power supply to the microcomputer 17, which is connected to the power source battery 1 (Vbat) when the switch 2 turns on.

An automatic distance measuring circuit 18 is arranged in a known manner, for automatic focusing (AF) on an object, to automatically measure a distance to a photo-taking object and to cause a lens (not shown) to be driven accordingly. The automatic distance measuring circuit 18 receives a signal necessary for measuring the distance (AFC signal) from the microcomputer 18 and sends a distance measurement signal (AFD signal) to the microcomputer 17. An automatic exposure (AE) circuit 19 is arranged in a known manner to measure the luminance of the object. To decide an apposite exposure (a shutter speed and an aperture value), the microcomputer 17 sends a signal for deciding a light measuring action (AEC signal) to the AE circuit 19 and receives from the A/E circuit 19 the data necessary for an exposure (an AED signal).

A display circuit 20 includes an LCD, LEDs, etc., arranged in a known manner to display information on a shutter speed, an aperture, completion of charging, a film sensitivity value, a remote control mode, a self-timer mode, etc. A shutter circuit 21 is arranged in a known manner to cause a shutter action to be controlled by the microcomputer 17 and to include a synchronizing switch. A diaphragm control circuit 22 is arranged to cause the diaphragm aperture of the lens to be controlled by the microcomputer 17.

A light emission stop circuit 23 is composed of a thyristor 231, a capacitor 232, a resistor 233 and a resistor 234. In the light emission stop circuit 23, the thyristor 231 has its anode connected to the positive pole of the main capacitor 6 and its cathode connected to the ground. The capacitor 232 is connected between the gate and the cathode of the thyristor 231. The resistor 233 is connected between the gate and the cathode of the thyristor 231. The resistor 234 is connected between the gate of the thyristor 231 and the microcomputer 17.

A light measuring circuit 30 is arranged in a known manner. A film sensitivity detecting circuit 400 is arranged in a known manner to automatically detect the sensitivity of the film in use and to send information on the film sensitivity (an ISO sensitivity signal) to the microcomputer 17. A flash zooming circuit 500 is arranged in a known manner. A date imprinting circuit 600 is arranged also in a known manner.

Figure 7:
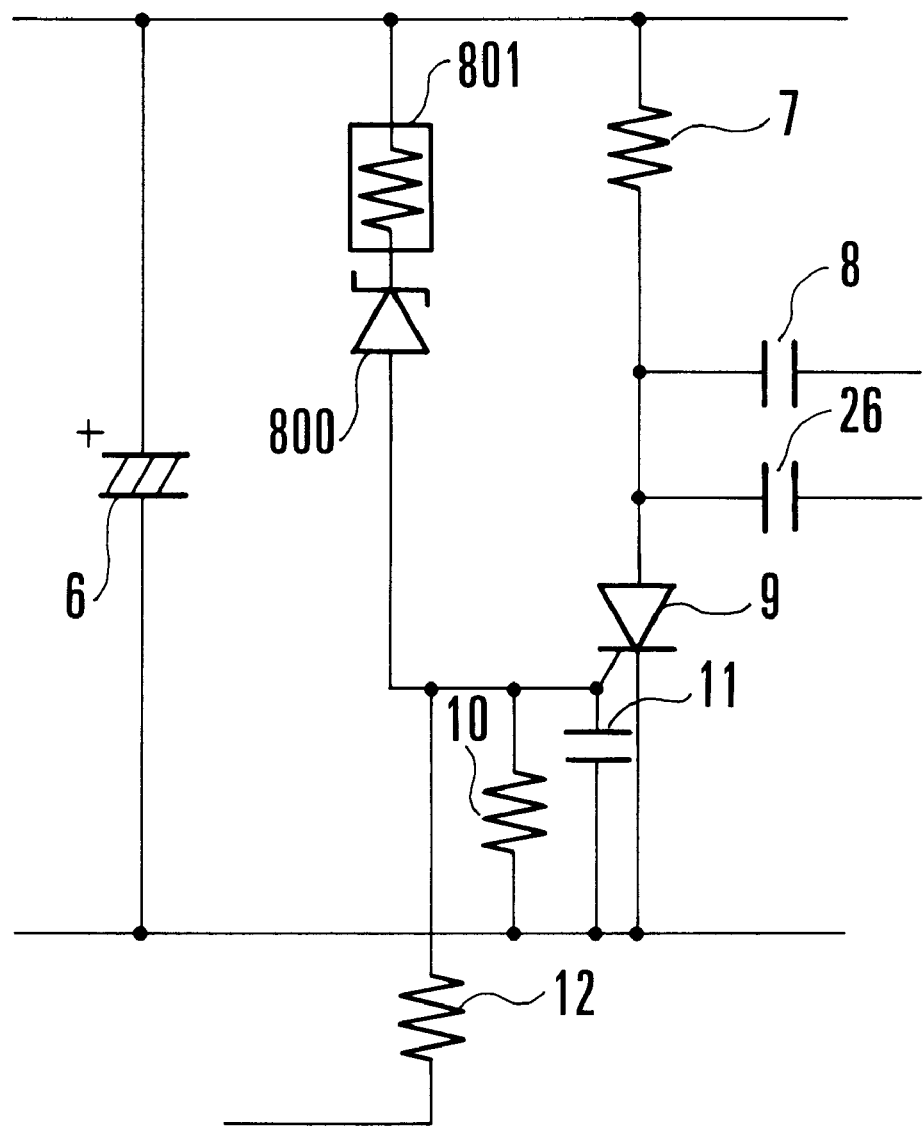
FIG. 7 is a circuit diagram showing by way of example a modification of the first embodiment.
Figure 8:
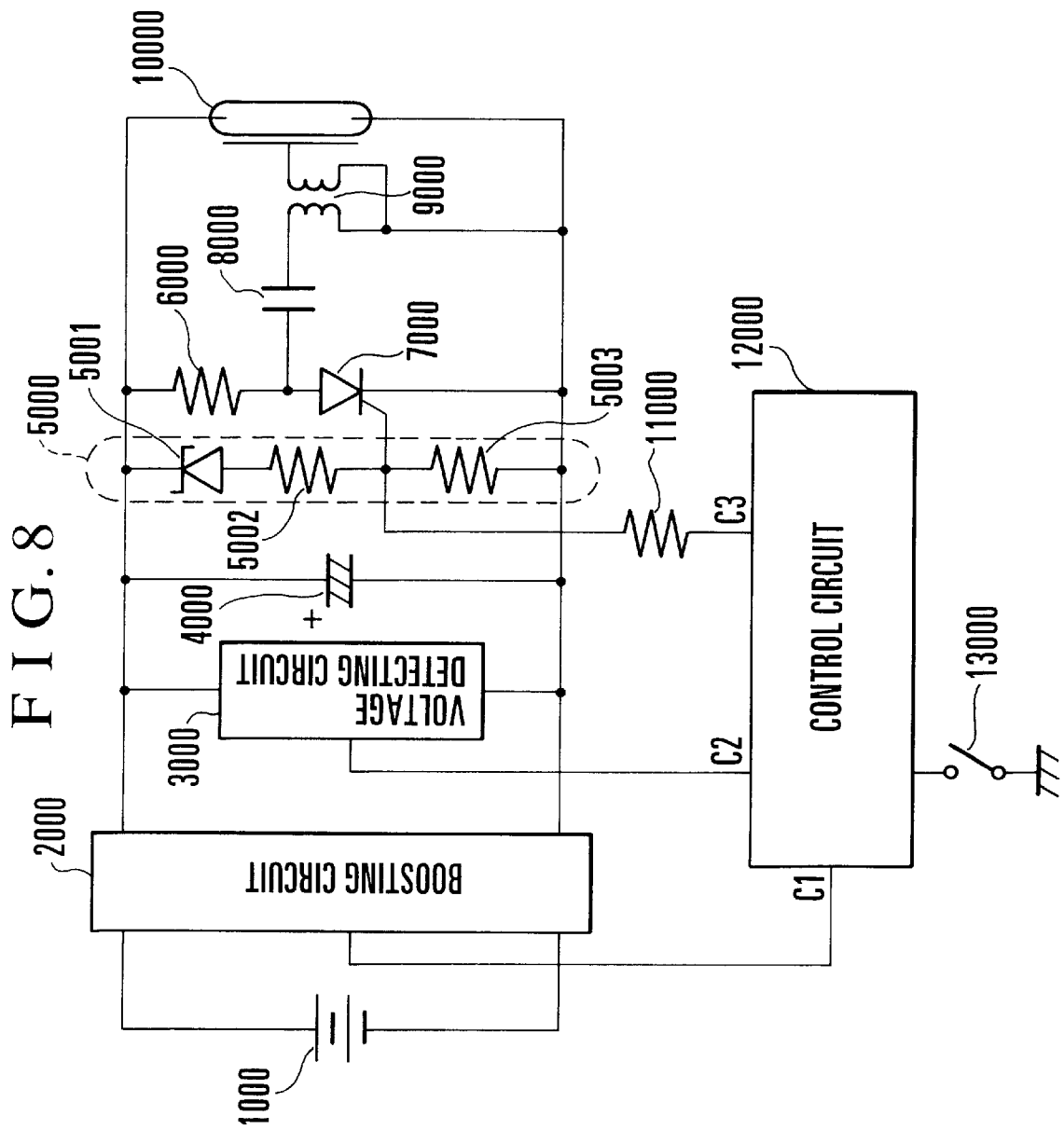
FIG. 8 is a block diagram showing by way of example the conventional circuit arrangement.

A voltage reference diode (Zener diode) 800 has its cathode connected to the anode of the main capacitor 6. A thermo-sensitive element 801, such as a thermistor, of negative characteristic has its one end connected to the anode of the voltage reference diode 800 and the other end connected to the gate of the thyristor 9. The resistance of the thermo-sensitive element 801 of negative characteristic increases when temperature decreases, and decreases when temperature increases. Thus, the voltage reference diode 800 and the thermo-sensitive element 801 constitute a series circuit. The anode side of the series circuit is connected to the gate of the light emission triggering thyristor 9. A circuit for automatically emitting light at the time of overcharging is formed by the voltage reference diode 800, the thermo-sensitive element 801, the thyristor 9, the resistor 10 and the capacitor 11. Incidentally, the voltage reference diode 800 and the thermo-sensitive element 801 may be conversely connected in a manner as shown in FIG. 7.

Figure 2:
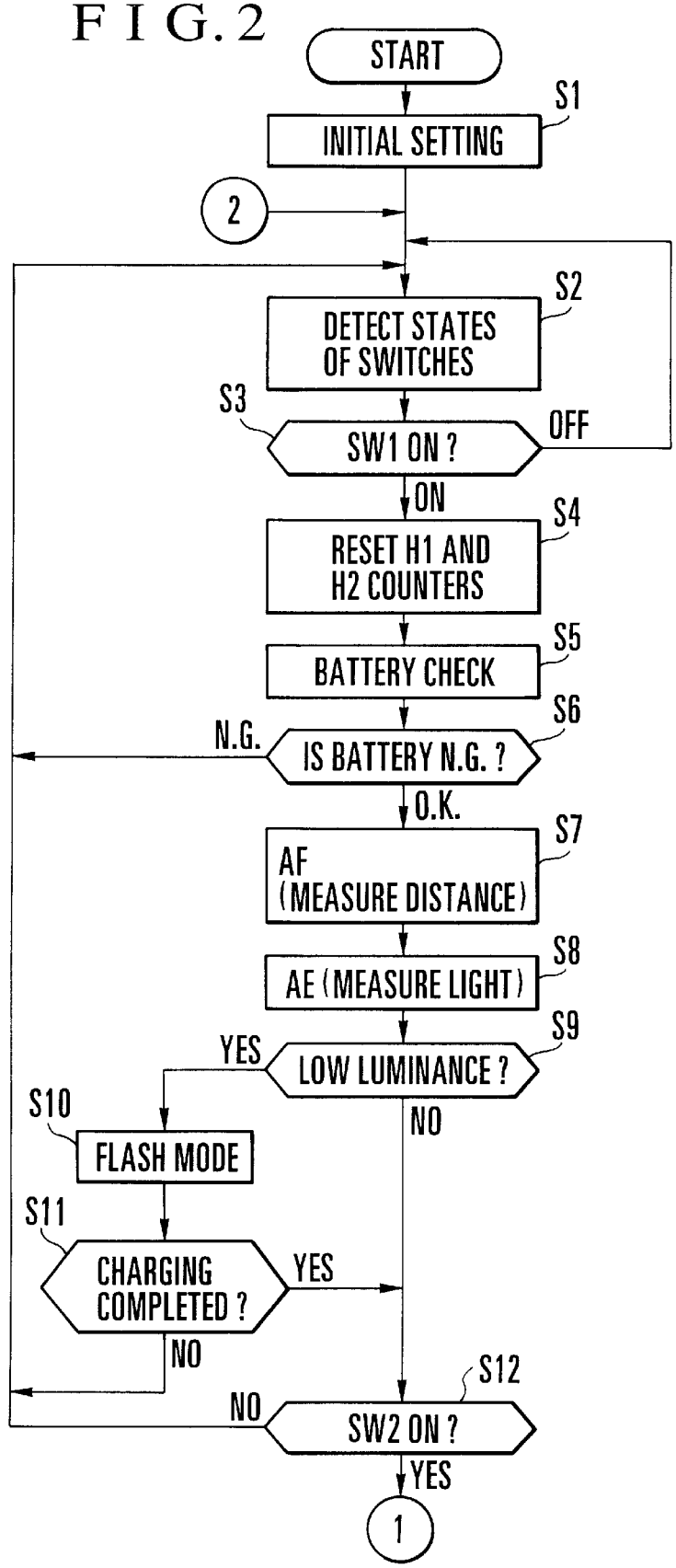
FIG. 2 is a flow chart showing an operation of the first embodiment of the invention.
Figure 3:
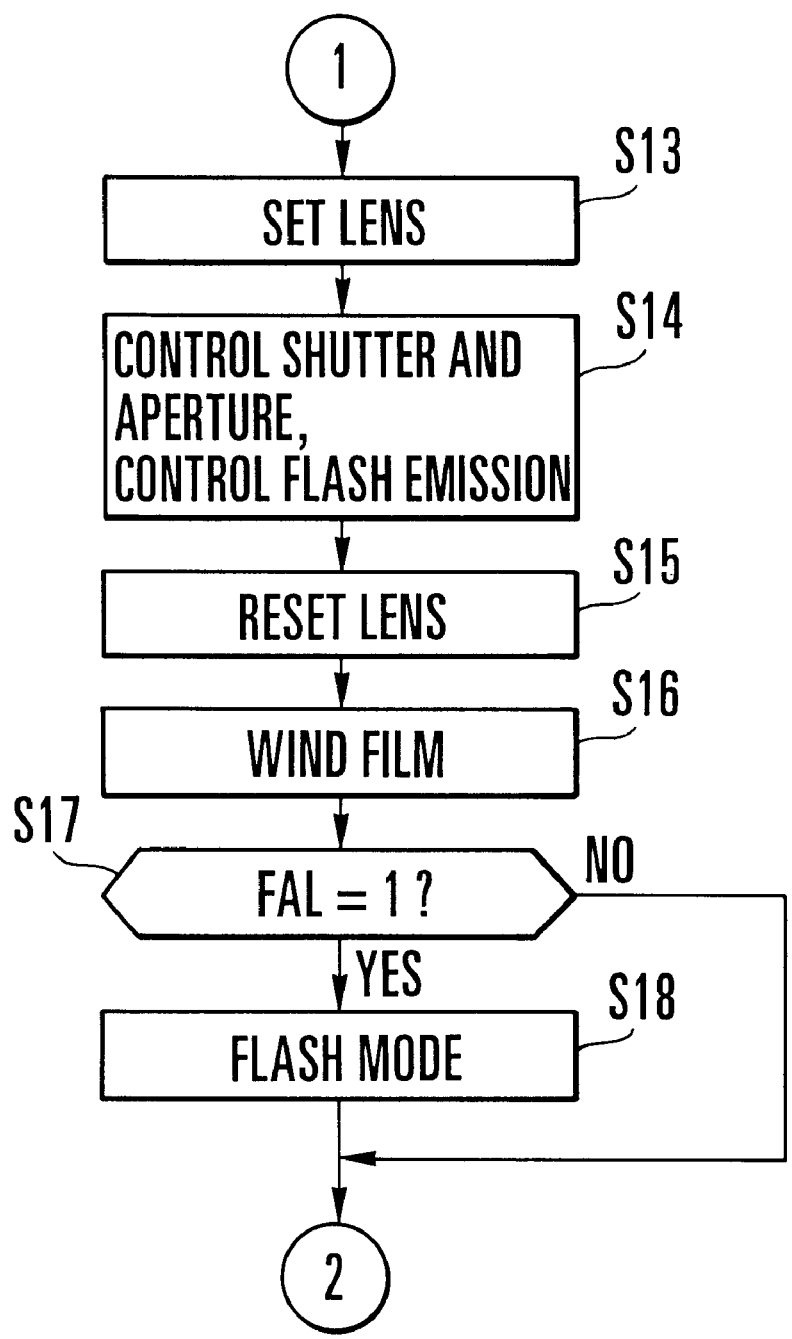
FIG. 3 is a flow chart showing an operation of the first embodiment of the invention.

FIG. 2 shows an operation of the camera in a flow chart. The power source battery 1 is connected to the boosting circuit 3 and the constant voltage circuit 15 begins to work when the power supply switch 2 turns on. Then, the constant voltage Vcc is generated at the constant voltage circuit 15. The constant voltage Vcc is supplied to the microcomputer 17 and also to each of applicable circuits. With the power inputted to the microcomputer 17, the internal CPU is reset. The microcomputer 17 performs programmed actions as shown in FIGS. 2 and 3.

At a step S1 in FIG. 2, an initial setting is first performed, for example, to clear flags of a program (flag FAL, flag RCHG, etc.) and to reset the contents of a memory. At a step S2, the switch circuit 16 is caused to detect the states of camera control switches, including shutter, aperture and flash mode change-over switches, a film sensitivity value change-over switch, a zoom switch, a release switch, etc. The switch circuit 16 sends signals indicative of the results of detection to the microcomputer 17. The film sensitivity detecting circuit 400 is caused to automatically read the film sensitivity information, such as a DX code.

The camera is provided with a release switch which is arranged, for example, to be a double pushing type including a half-push switch SW1 which causes the camera to make preparation for photo-taking when it turns on and a full-push switch SW2 which causes the camera to carry out a photo-taking operation when it turns on. At a step S3, a check is made to find if the switch SW1 is in an on-state. If not, the flow of operation returns to the step S2. If so, the flow proceeds to the next step S4.

At the step S4, counters H1 and H2 which are arranged to count set numbers of light emitting times are reset. At a step S5, the microcomputer 17 makes a check for the voltage of the power source battery 1 (battery voltage). For example, the A/D converter 173 which is disposed within the microcomputer 17 is arranged to convert a battery voltage level from an analog value into a digital value, which is then stored in the memory beforehand. At a step S6, the microcomputer 17 makes a check to find whether the battery voltage is sufficient (O.K.) or insufficient (N.G.). If the level of battery voltage detected is less than a certain level which is, for example, a minimum operatable level required by the camera, the battery is considered to be not good (N.G.), and the flow returns to the step S2. If the detected battery voltage level is found to be equal to or greater than the certain level, the battery voltage is considered to be O.K., and the flow proceeds to the next step S7.

At the step S7, the microcomputer 17 sends the AFC signal necessary for distance measurement to the automatic distance measuring (automatic focusing, i.e., AF) circuit 18. The automatic distance measuring circuit 18 sends the AFD signal necessary for distance measurement to the microcomputer 17. Then, a distance to the object is automatically measured. The lens (not shown) is driven to focus on the object (a distance measuring action).

At a step S8, the microcomputer 17 sends the AEC signal to the AE (automatic exposure) circuit 19 for deciding a light measuring action. The AE circuit 19 measures the luminance of the object and sends data (AED signal) necessary for an exposure to the microcomputer 17. Then, an apposite exposure is decided by computing a shutter speed and an aperture value.

At a step S9, a check is made to find if the luminance of the object measured at the step S8 is less than a certain luminance value (a low luminance level). If so, it is decided to be necessary to use flash light, and the flow proceeds to a step S10 to set a flash flag FAL at "1". If not, the flag FAL is set at "0", and the flow proceeds to a step S12.

The step S10 is a step for a sequence of flash-device charging processes to be executed in a flash mode in a manner which will be described in detail hereinafter with reference to FIG. 4. At a step S11, a check is made to find if the step S10 for the flash mode has been finished. If so, the microcomputer 17 performs a latching action required upon completion of charging and causes the display circuit 20 to make a display showing completion of charging, and the flow proceeds to a step S12. If not, the flow returns to the step S2. At the step S12, in a case where no flash emission is necessary, a check is made to find if the switch SW2 is in an on-state. If not, the flow returns to the step S2. If so, the flow proceeds to a step S13 which is shown in FIG. 3. At the step S13, a lens driving action is performed. The lens is moved from its reset position as much as a moving amount decided on the basis of the distance measurement data obtained by the AF circuit 18 to adjust a focused position of the lens.

At a step S14, the shutter, the aperture and flash emission are controlled as necessary. The details of a sequence of these control actions will be described later with reference to FIG. 5. At a step S15, a lens driving action is performed to bring the lens to a reset (initial) position. At a step S16, a film winding action is performed.

At a step S17, a check is made for the state of the flash flag FAL. If the flash flag FAL is found at "1" (FAL=1), thus indicating the necessity of flash emission, the flow proceeds to a step S18. If not, the flow returns to the step S2. Like the step S10, the step S18 is a step for a sequence of flash-device charging processes to be executed in a flash mode as described in detail below with reference to FIG. 4.

Figure 4:
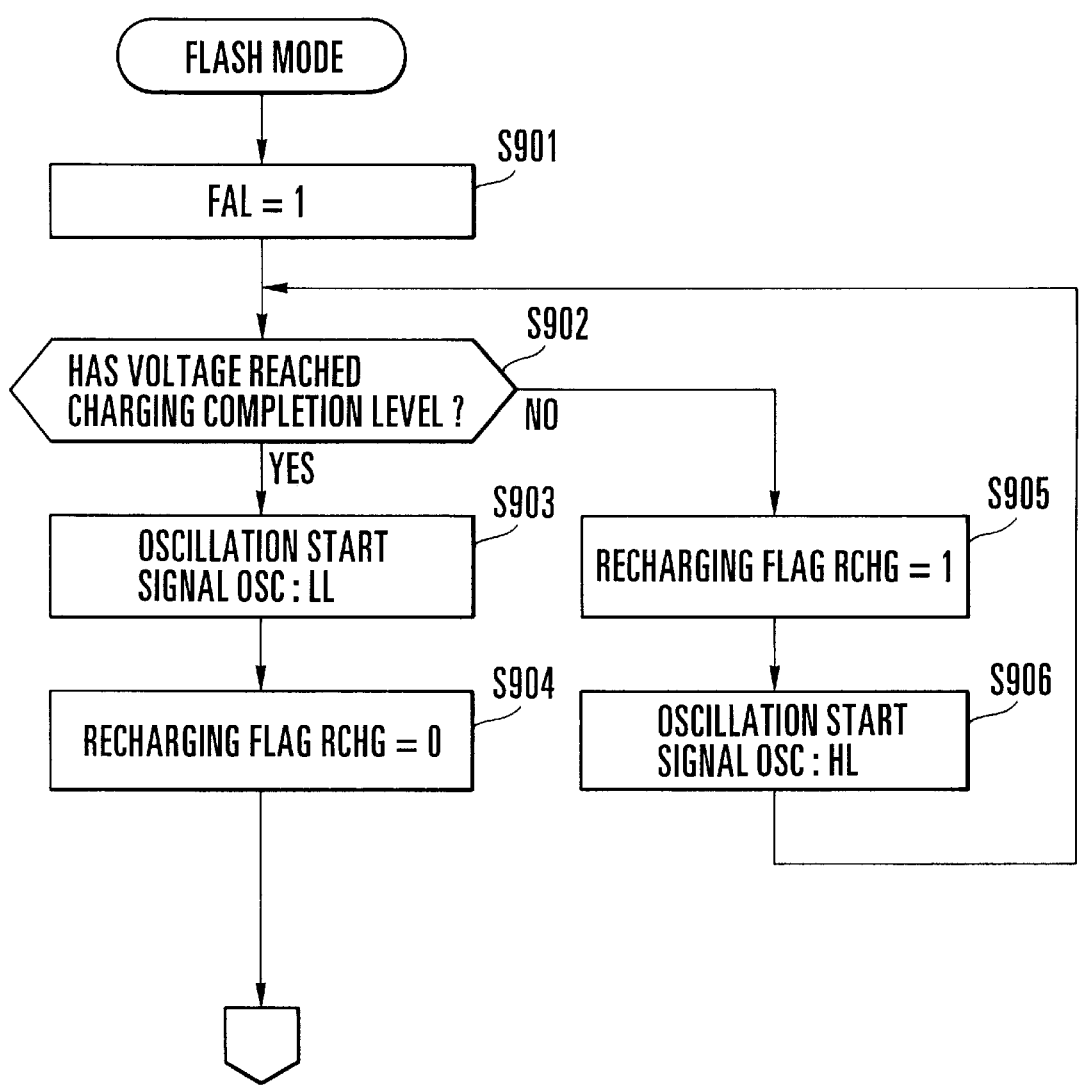
FIG. 4 is a flow chart showing an operation of the first embodiment of the invention.

FIG. 4 is a flow chart showing a flow of the charging processes in the flash mode. Referring to FIG. 4, at a step S901, the flash mode flag FAL is first set at "1" which indicates use of flash light (the flag FAL is at "0" when flash light is not required).

Next, the microcomputer 17 issues an instruction to have a signal sent to the multiplexer 174 from the divided-voltage detecting circuit 5, which is arranged to detect a divided voltage of the voltage of the main capacitor 6 obtained by the voltage dividing resistors 52 and 53 and is provided with the capacitors 51 and 54 for stable detection. The signal from the divided-voltage detecting circuit 5 is sent to the multiplexer 174 which is disposed within the microcomputer 17 together with the A/D converter 173. Then, the charging voltage of the main capacitor 6 thus detected is converted from an analog value into a digital voltage value and stored in the CPU 171. At a step S902, a check is made to find if the level of the charging voltage measured in the above-stated manner is a preset level for flash emission by the flash discharge tube 14 and is sufficient for flash photography. If so, the flow proceeds to a step S903. If not, the flow proceeds to a step S905.

At the step S903, to bring the voltage boosting action to a stop upon completion of charging, the oscillation start signal OSC of the microcomputer 17 is changed from a high level (HL) to a low level (LL). With the signal OSC set at a low level, the NPN transistor 32 is turned off through the diode 35. Accordingly, the PNP transistor 31 turns off to cut off the supply of power from the power source battery 1, so that oscillation comes to an end.

At a step S904, a recharging flag RCHG is set at "0" which indicates that the main capacitor 6 has been charged at least up to the minimum level necessary for flash emission or is already above that level. The flow then comes from the step S904 to the step S11 or S2.

If the charging level is found at the step S902 to be insufficient for flash emission, the flow proceeds to the step S905. At the step S905, the recharging flag RCHG is set at "1", and the flow proceeds to a step S906. At the step S906, to cause the voltage boosting action to start, the microcomputer 17 changes the oscillation start signal OSC from a low level to a high level. This causes the NPN transistor 32 to turn on through the diode 35. The PNP transistor 31 is also turned on to supply the power of the power source battery 1 to the oscillation transformer 36, causing the oscillation transformer 36 to start oscillating. Then, a high voltage is generated on the secondary side 36c of the oscillation transformer 36 to charge the main capacitor 6 through the diodes 4 and 29. A normal sequence of charging actions are performed in such a manner.

However, if a charging voltage detecting signal line SEN which is normally connected to the microcomputer 17 happens to be disconnected, the charging voltage would be boosted up to a level above a setting voltage. In that event, the main capacitor 6 is overcharged. Then, when the voltage of the main capacitor reaches a Zener voltage of the Zener diode 800 which is set at a level lower than a rated voltage of the main capacitor, a predetermined current flows to the Zener diode 800 to cause a current to flow to the gate of the thyristor 9 through the thermistor 801, thereby turning on the thyristor 9. At this time, a charging current has already been caused by the action of the boosting circuit 3 to flow through the resistor 7 to the capacitors 8 and 26 to charge these capacitors. Meanwhile, the main capacitor 6 has been charged to apply a high voltage to the flash discharge tube 14. Therefore, with the thyristor 9 turned on, a sum of the terminal voltage of the capacitor 6 and that of the capacitor 26 is applied to both ends of the flash discharge tube 14. The electric charge of the capacitor 8 is discharged to generate pulses on the primary side of the transformer 13. The pulse generation then generates high-voltage pulses on the secondary side of the transformer 13 to trigger and cause light emission from the flash discharge tube 14. Thus, the light emission releases the main capacitor 6 from an overcharged state.

As described above, a voltage obtained before a explosion proof valve for the main capacitor 6 comes to act, i.e., a protection voltage for the main capacitor 6 (hereinafter referred to as the protection voltage Vcs), becomes a sum of the voltage Vz of the two ends of the Zener diode 800 and a voltage obtained at the resistors serially connected to the Zener diode 800. With voltages obtained at two ends of the resistor 10 and at two ends of the thermo-sensitive element 801 assumed respectively to be $V_{10}$ and $V_{801}$, the protection voltage Vcs can be expressed as follows:

$$Vcs = Vz + V_{10} + V_{801} \quad (1).$$

(i) In a case where the thermo-sensitive element 801 is a simple resistor rather than a thermistor:

With the Zener current assumed to be Iz, the voltage $V_{801}$ can be expressed as "$V_{801} = R_{801} \times Iz$", being a value proportional to the Zener current Iz.

Figure 6:
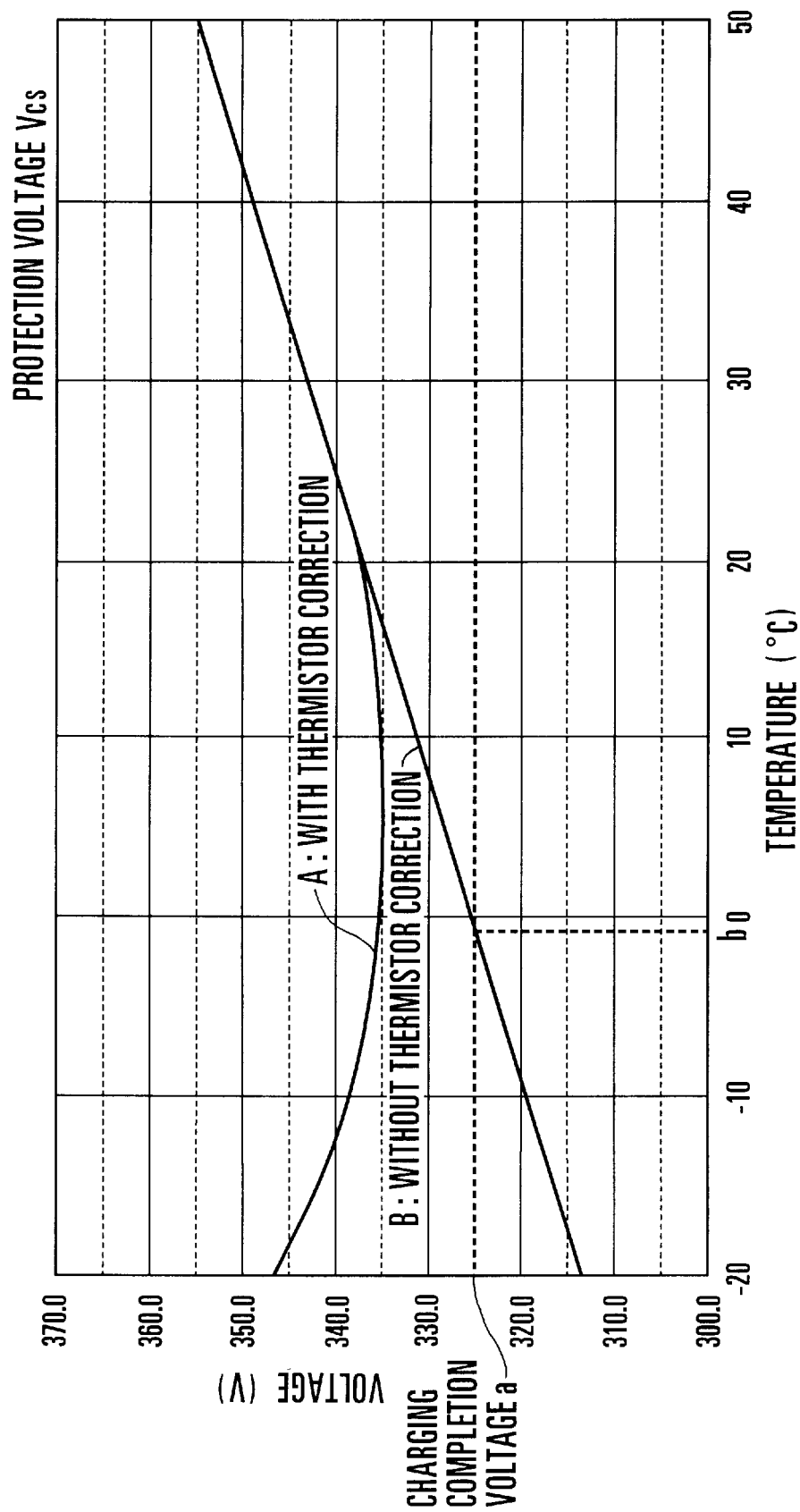
FIG. 6 shows the temperature characteristic of a protection voltage Vcs set in the circuit arrangement of the first embodiment.

However, since the Zener diode 800 has a temperature characteristic peculiar to a semiconductor, the Zener voltage Vz decreases accordingly as temperature becomes lower. Therefore, the protection voltage Vcs becomes as represented by a curve B shown in FIG. 6. The protection voltage Vcs thus becomes lower than the charging completion voltage "a" V when temperature is lower than "b" ° C., as shown in FIG. 6. At a lower temperature not exceeding "b" ° C., therefore, light emission might be erroneously made before completion of the process of charging. In the first embodiment, this premature light emission is prevented by using the thermo-sensitive element 801 as a thermistor.

(ii) In a case where a thermistor is employed as the thermo-sensitive element 801:

The thermistor is a unique semiconductor resistor having its resistance value negatively varying to a great degree for temperature variations and is obtained by mixing two to four kinds of metal oxides into a desired shape and sintering the mixture at a high temperature. The temperature dependency of the thermistor is as expressed below:

$$R = R_0 \times \exp\{B \times [(1/T) - (1/T_0)]\} \qquad (2)$$

wherein $T_0$: reference temperature (298.15 K (25° C.)), $R_0$: a resistance value obtained at $T_0$ K, B: a B constant (K)

As shown in the formula (2), the resistance value increases accordingly as temperature decreases. The voltage at two ends of the thermo-sensitive element 801 is expressed as follows:

$$V_{801} = R_{801} \times Iz.$$

Therefore, the resistance value $R_{801}$ increases accordingly as temperature decreases and the voltage $V_{801}$ of the thermo-sensitive element 801 increases accordingly as temperature decreases. The use of the thermistor thus causes the protection voltage Vcs at low temperature to increase by offsetting the Zener voltage which decreases when temperature decreases. This is illustrated by a curve A in FIG. 6. The protection voltage Vcs thus never becomes lower than the charging completion voltage "a" V even when temperature drops, so that erroneous flash emission by the flash device can be prevented.

The same effect can be attained in a case where the voltage reference diode 800 and the thermo-sensitive element 801 are conversely connected as shown in FIG. 7. Further, the thermo-sensitive element 801 may be replaced with some other temperature compensating element of negative characteristic other than the thermistor.

Figure 5:
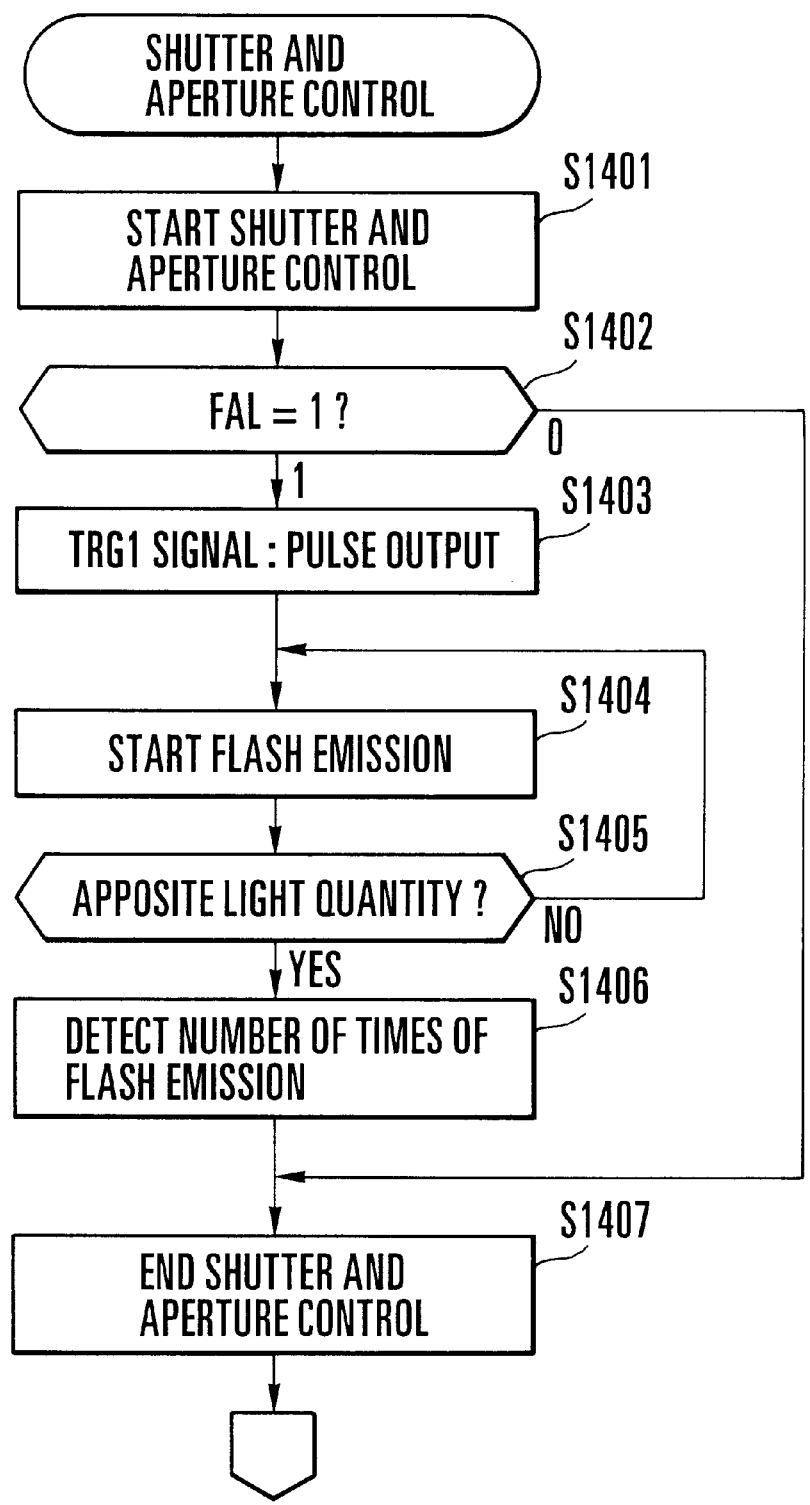
FIG. 5 is a flow chart showing an operation of the first embodiment of the invention.

FIG. 5 is a flow chart showing the shutter and aperture control actions to be performed at the step S14. At a step S1401 in FIG. 5, the shutter circuit 21 and the diaphragm control circuit 22 are caused to operate to obtain a shutter speed and an aperture value decided according to light measurement data at the step S8 and by the flash emission amount and exposure computing operation performed at the step S14.

At the next step S1402, a check is made for the state of the flash flag FAL. If the flash flag FAL is at "1" thus indicating the necessity of flash emission, the flow of operation proceeds to a step S1403. If the flash flag FAL is at "0" thus indicating that flash emission is not required, the flow proceeds to a step S1407. At the step S1403, a pulse signal is outputted as the trigger signal TRG1 from the microcomputer 17.

At a step S1404, a charging current is caused to flow to the capacitor 8 and the capacitor 26 through the resistor 7 when the boosting circuit 3 acts. When the pulse signal TRG1 is outputted from the microcomputer 17 while the main capacitor 6 is charged to have a high voltage applied to the flash discharge tube 14, the gate of the thyristor 9 is turned on through the resistor 12. With the gate of the thyristor 9 turned on, one end of each of the capacitors 8 and 26 is grounded to make discharge. Then, the sum of the terminal voltage of the main capacitor 6 and the terminal voltage of the flash discharge tube 14 is applied to the both ends of the flash discharge tube 14. Then, the discharge of the capacitor 8 causes pulses to be generated on the primary side of the transformer 13 which causes in turn high-voltage pulses to be generated on the secondary side of the transformer 13. The high-voltage pulses trigger the flash discharge tube 14 to emit flash light.

At a step S1405, a check is made to find if the emission of flash light has reached an apposite light quantity for exposure. If not, the flow returns to the step S1404 to continue the flash light emission as much as a light emission amount corresponding to the apposite light quantity for exposure. Upon completion of discharge, the flash light emission is brought to a stop. At a step S1406, the number of times of light emission is detected. At a step S1407, the action of the shutter circuit 21 and that of the diaphragm control circuit 22 are brought to a stop to obtain the shutter time (speed) and an aperture value decided according to the light measurement data and the light emission amount and by the exposure computing operation. The flow then proceeds to the step S15.

A second embodiment of the invention is next described below with reference to FIGS. 9 to 12.

Figure 9:
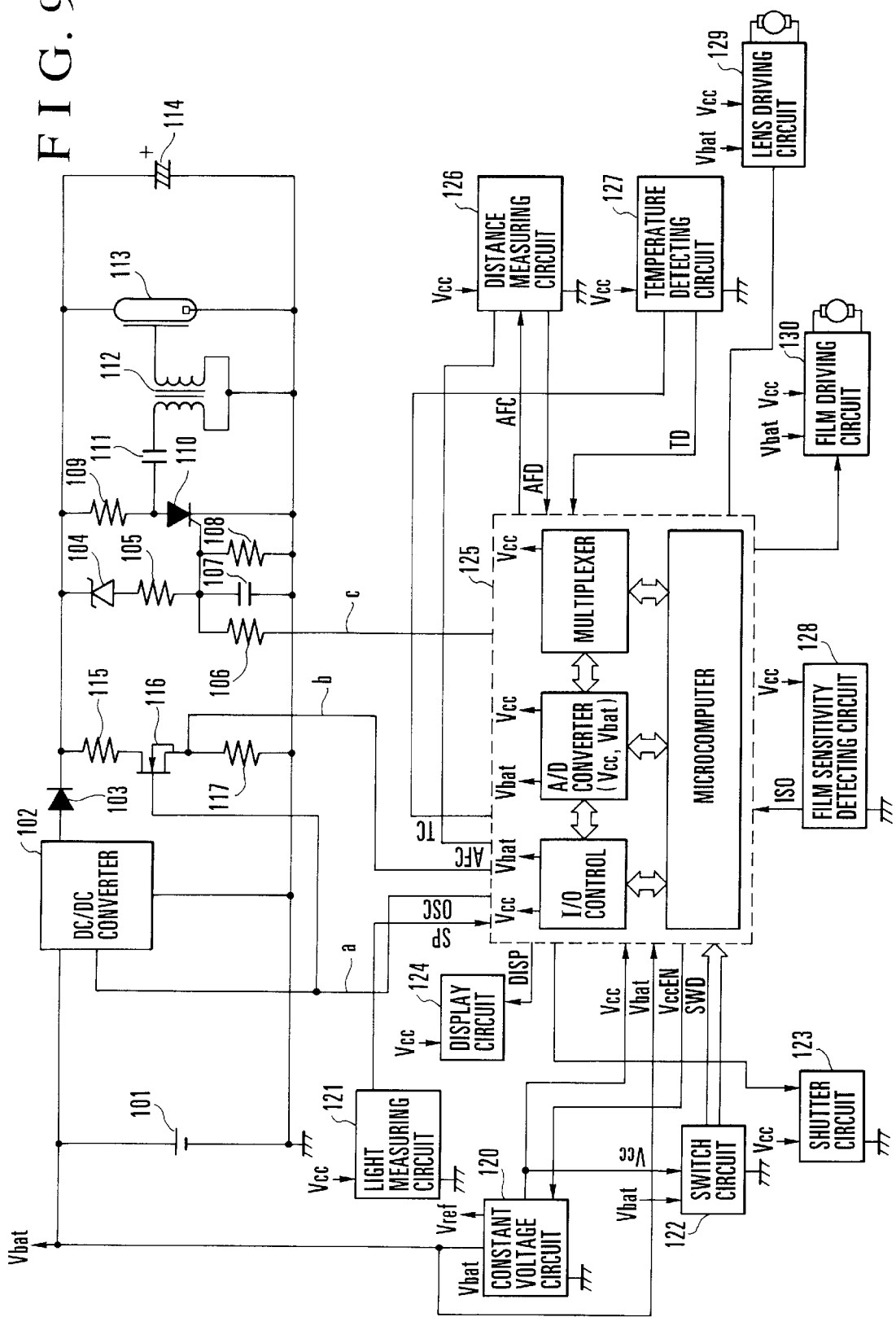
FIG. 9 is a block diagram showing the circuit arrangement of a flash device for a camera according to a second embodiment of the invention.
Figure 10:
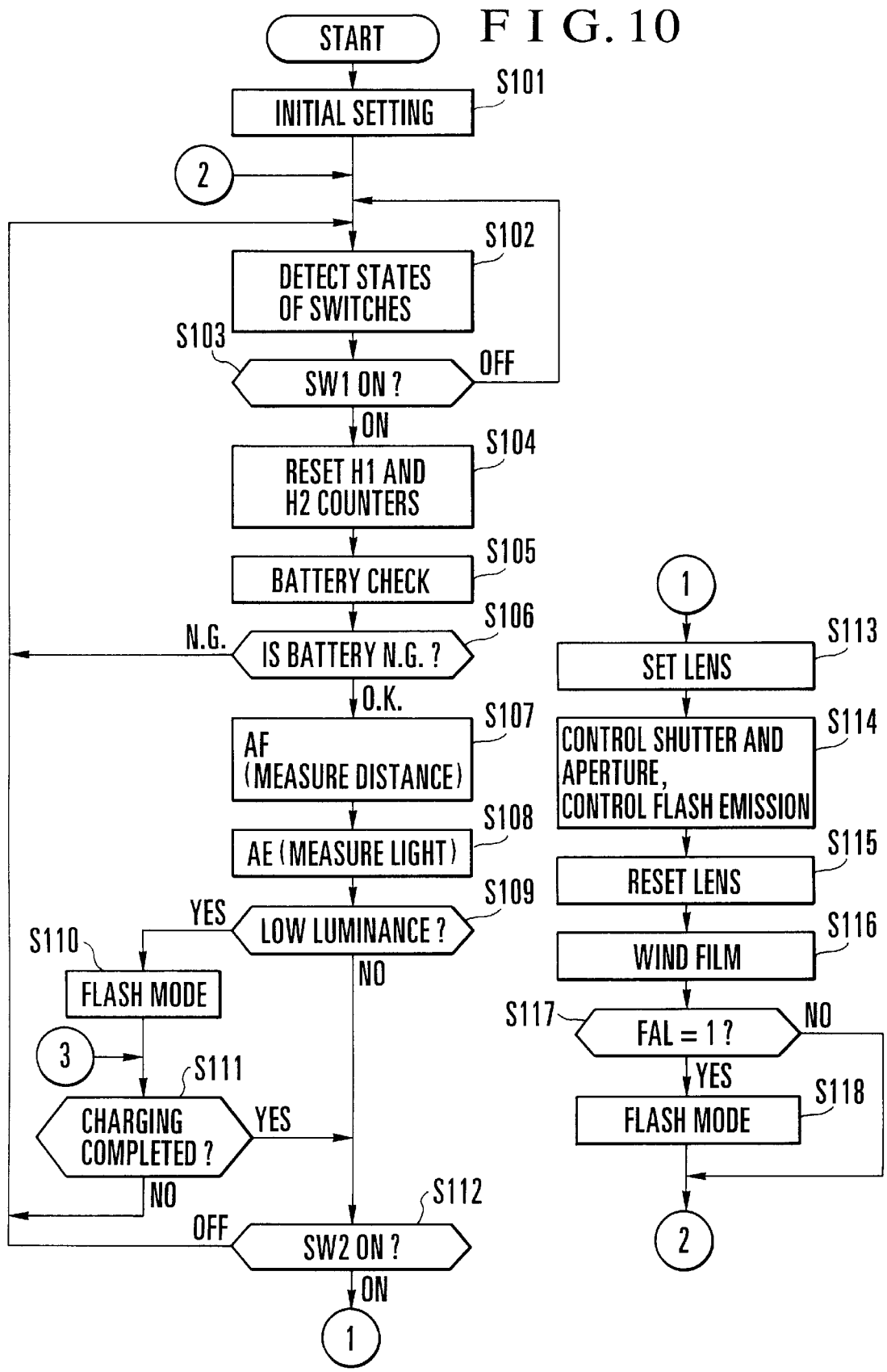
FIG. 10 is a flow chart showing an operation of the camera shown in FIG. 9 according to the second embodiment.
Figure 11:
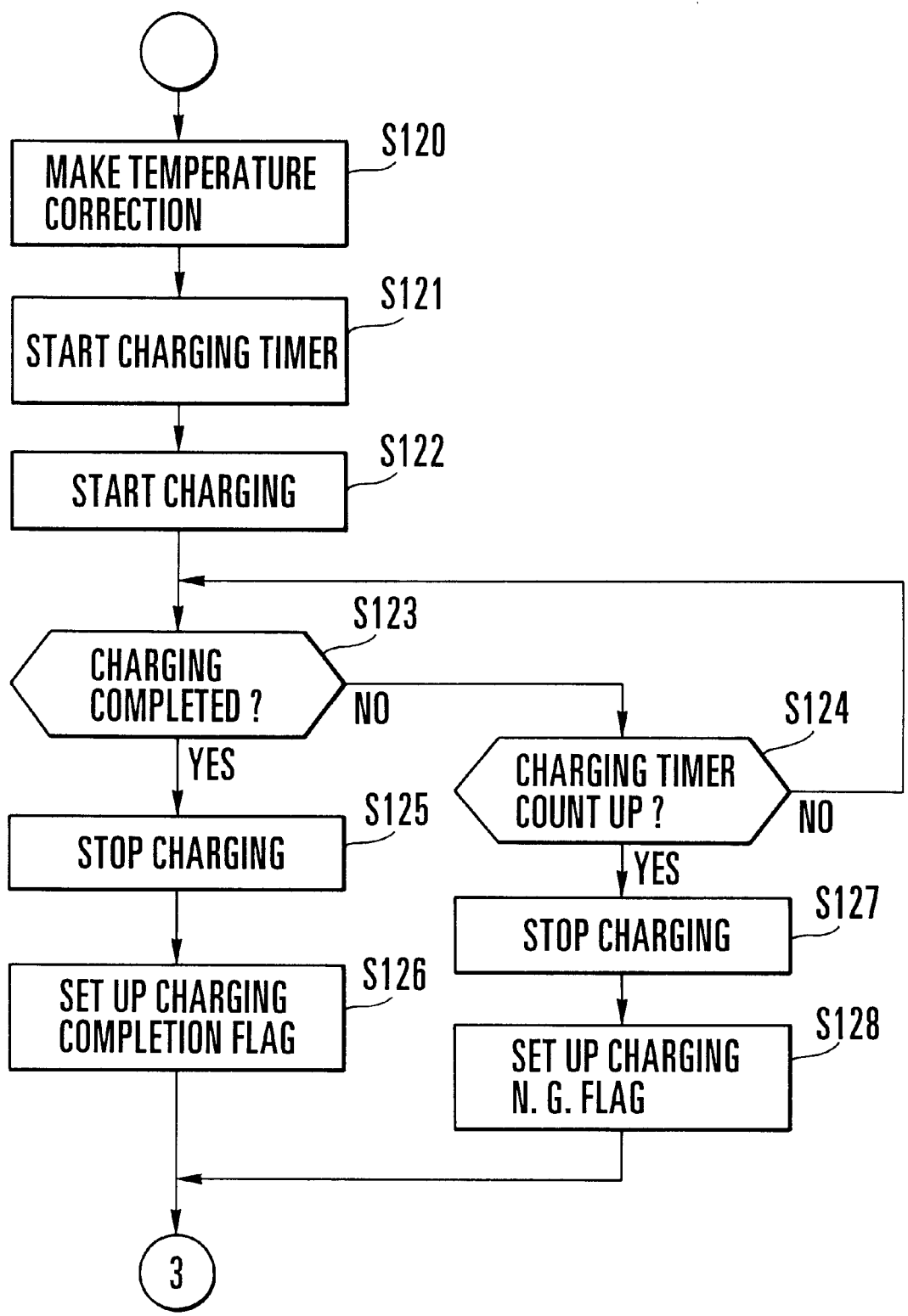
FIG. 11 is a flow chart showing the operation of the same camera in a flash mode shown in FIG. 10.
Figure 12:
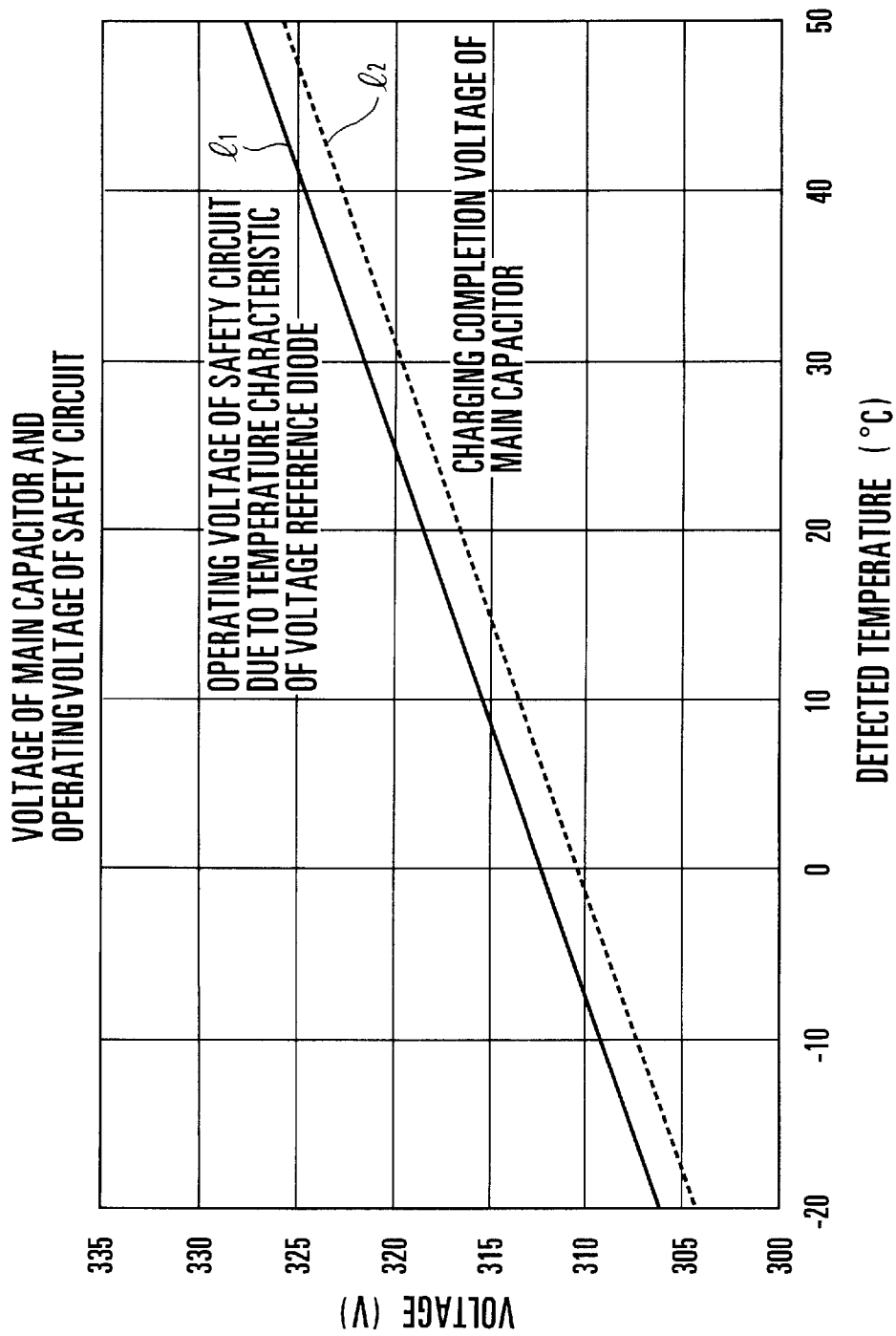
FIG. 12 is a graph showing a relation between the charging voltage of a main capacitor and the operating voltage of a safety circuit in the flash device shown in FIG. 9.

FIG. 9 is a circuit block diagram showing a flash device for a camera according to the second embodiment of the invention. FIG. 10 is a flow chart showing an operation of the camera shown in FIG. 9. FIG. 11 is a flow chart showing a flow of operation to be executed when the camera is in a flash mode shown in FIG. 10. FIG. 12 shows a relation between the charging voltage of a main capacitor and the operating voltage of a safety circuit in the flash device shown in FIG. 9.

Referring to FIG. 9, a battery 101 is a power source of the camera. The flash device is provided with a DC/DC converter circuit block 102 as a boosting circuit for boosting the battery 101, a high-voltage rectifying diode 103, a high-voltage reference diode (Zener diode) 104, a resistor 105, a thyristor 110, a capacitor 107, and a resistor 108. A parallel circuit composed of the capacitor 107 and the resistor 108 is connected between the gate and the cathode of the thyristor 110. A series circuit composed of the high-voltage reference diode 104 and the resistor 105 is connected to the positive pole of the main capacitor 114 and the gate of the thyristor 110.

Another resistor 109 is connected between the anode of the thyristor 110 and the positive pole of a main capacitor 114. There is provided another capacitor 111. A trigger transformer 112 has its output connected to a trigger electrode of a flash discharge tube 113. The main capacitor 114 is connected in parallel to the flash discharge tube 113. A resistor 115, a switch element 116 and another resistor 117 constitute a series circuit, which is also connected in parallel to the main capacitor 114.

Terminals "a", "b" and "c" are connected to a control circuit 125 which is composed of a one-chip microcomputer disposed on the side of a camera body. A constant voltage circuit 120 is arranged to obtain and supply a reference voltage Vref and power Vcc to each of circuit blocks. The constant voltage circuit 120 is controlled through a terminal VccEN by the control circuit 125. A light measuring circuit 121 is arranged to measure light. A switch circuit 122 is arranged to operate by the power Vcc to transmit the states of switches to the control circuit 125. A shutter circuit 123 is arranged for a shutter. A display circuit 124 is arranged to display necessary information, for example, on an LCD or the like.

The camrera is provided with a distance measuring circuit 126, a temperature detecting circuit 127 and a film sensitivity detecting circuit 128 which are arranged to transmit information necessary for photo-taking to the control circuit 125 through terminals. A lens driving circuit 129 is provided for lens driving. A film driving circuit 130 is provided for film transport under the control of the control circuit 125.

The second embodiment which is arranged as described above operates as described below.

With the battery 101 set in place, the control circuit 125 of the camera is inoperative in a low energy consuming state. When a power supply switch which is disposed within the switch circuit 122 a nd interlocked with a member such as a barrier of the camera turns on in th is state, the control circuit 125 begins to operate. The control circuit 125 gives a signal through the terminal VccEN to the constant voltage circuit 120. The constant voltage circuit 120 supplies the reference voltage Vref and the power Vcc to each of the circuit blocks. Actions to be performed thereafter are as described below with reference to FIG. 10 which is a flow chart.

At a step S101 in FIG. 10, a process of initial setting necessary for the microcomputer is carried out. At a step S102, the power Vcc is supplied to the switch circuit 122. At a step S103, a check is made for the state of a switch SW1 which is arranged within the switch circuit 122 to turn on when a release button is pushed to its half pushed position. If the switch SW1 is found to be in its on-state, the flow proceeds to a step S104. At the step S104, predetermined counters are set in their initial states. At a step S105, a battery checking process is performed.

At a step S106, a check is made to find if the battery is in a state necessary for photo-taking by the camera. If not, the flow of operation returns to the step S102. If so, the flow proceeds to a step S107. At the step S107, a signal is given to a terminal AFC to cause the distance measuring circuit 126 to measure a distance to a photo-taking object. Information on the distance thus measured is given through a terminal AFD to the control circuit 125.

At a step S108, the luminance of the object is measured. Information on the luminance thus measured is supplied to the control circuit 125 through a terminal SP. At a step S109, the information (data of luminance) is checked to find if the object luminance is darker than a predetermined luminance. If so, the flow of operation proceeds to a step S110 which is provided for a flash mode.

A subroutine for an operation in the flash mode is shown in a flow chart of FIG. 11 as described below.

At a step S120 in FIG. 11, the temperature detecting circuit 127 shown in FIG. 9 is first caused to detect and obtain data of temperature at the time of charging, and, then, a temperature correcting action is performed according to the data of temperature detected, as shown in FIG. 12. Referring to FIG. 12, a full line curve 11 shows the temperature characteristic of the voltage reference diode. A broken line curve 12 indicates the charging completion voltage which is to be set for the main capacitor 14 in correspondence with the temperature value detected by the temperature detecting circuit 127. A voltage value on the axis Y corresponding to a point of the curve l2 defined by the detected temperature value on the axis X is obtained. A correction value corresponding to this voltage value is obtained by an A/D converter. In this case, the charging completion voltage of the main capacitor 114 is set at a voltage lower by a prescribed voltage than the operating voltage of the safety circuit which is set by taking into consideration the temperature characteristic of the voltage reference diode 104. For example, when the detected temperature is at 10° C., the conducting voltage of the voltage reference diode 104 is 316 V. Then, the charging completion voltage of the main capacitor 114 is set at a lower voltage value of 313 V. The charging voltage is thus set by the step S120 at a value which is lower than the conducting voltage of the voltage reference diode 104 by a prescribed voltage in accordance with the detected temperature.

At a step S121, a charging timer which is arranged to cut off the process of charging after the lapse of 10 to 15 sec is caused to start a time count. At a step S122, a charging start signal of high level is applied to the terminal "a" to actuate the DC/DC converter 102 to boost the voltage of the battery 101 and to cause the main capacitor 114 to begin to be charged through the high-voltage rectifying diode 103. At the same time, the signal of the terminal "a" applies a high level signal to the gate of the switch element 116 which is an N-ch FET to make the switch element 116 conductive, thereby dividing the charging voltage of the main capacitor 114 through the resistors 115 and 117. The divided voltage thus obtained at the resistor 117 is supplied to the control circuit 125 through the terminal "b". The resistance value of the resistor 115 is between several hundred kiloohms to one megaohm while that of the resistor 117 is several kiloohms. Therefore, a potential to be generated at the resistor 117 is set at such a value that is equal to or less than 2 V. The above-stated high level signal is thus set at a such a level that the switch element 116 is never caused to become nonconductive by the potential generated at the resistor 117.

The potential generated at the resistor 117 rises when the amount of charging of the main capacitor 114 increases. At a step 123, the charging voltage is detected through the terminal "b" by the A/D converter disposed within the control circuit 125. If the charging voltage is found to be lower than a predetermined value, the flow of operation proceeds to a step S124. At the step S124 a check is made to find if the time count by the charging timer has come to an end. If not, the flow returns to the step S123 to repeat the same process until the charging voltage, i.e., the potential of the main capacitor 114 reaches the voltage decided at the step S120.

If the process of charging is found at the step S123 to have been completed, i.e., when the charging voltage s et at the step S120 is reached, the flow proceeds to a step S125 to stop applying the signal to the terminal "a " to bring the charging process to an end. At a step S126, a flag is set up to indicate that the charging process has come to an end, and the flow returns to a part (3) in the flow chart of FIG. 10.

Further, in a case where the count by the charging timer is found at the step S124 to have reached its end before completion of the charging process, the flow proceeds to a step S127. At the step S127, the signal application to the terminal "a" is brought to a stop, and the DC/DC converter 102 and the switch element 116 are turned off. At a step S128, a charging NG flag indicating that the charging process is unfinished is set up, and the flow returns to the part (3) in the flow chart of FIG. 10.

Again referring to FIG. 10, if the luminance of the object is found at the step S109 to be brighter than the predetermined value, the flow proceeds to a step S112. At the step S112, a check is made to find if the switch SW2 is turned on by a second pushing stroke of the shutter button. If so, the flow proceeds to a step S113. At the step S113, focus adjustment is made by controlling the lens driving circuit 129 on the basis of the measured distance data obtained at the step S107.

At a step S114, the shutter circuit 123 is caused to control a shutter time (opening speed or time) according to the object luminance obtained at th e step S108 and data of ISO film sensitivity data. In the event of a low luminance requiring use of the flash device, the shutter is controlled and the flash device is caused to make flash emission at a predetermined aperture value.

The flash device is caused to make flash emission by applying a high level signal to the terminal "c" shown in FIG. 9 to give a gate signal through the resistor 106 to the thyristor 110, thereby rendering the thyristor 110 conductive. By this, the capacitor 111 is caused through the primary winding of the trigger transformer 112 to discharge in such a way as to apply a high pulse voltage to the trigger electrode of the flash discharge tube 113. The flash discharge tube 113 is thus excited to lower the impedance thereof to cause the main capacitor 114 to discharge at once. The energy of such discharge of the main capacitor 114 is converted into light energy by the flash discharge tube 113. The flash light thus obtained is used as an auxiliary light to illuminate the object. The flash flag is set at "1" when the flash device is used.

At a step S115, when the shutter is opened, the lens which has been in its focus position is brought back to its initial standby position. At a step S116, the film driving circuit 130 is controlled to cause the film which is used for the photo-taking exposure to be wound up to an extent corresponding to one frame. At a step S117, a check is made to find if the flag indicating the use of the flash device at the step S114 is set up. If the flag is found to be at "1" thus indicating the use of the flash device, the flow proceeds to a step S118. At the step S118, the charging process of the flash mode is carried out. Since the charging process is the same as the process of the step S110, the details thereof are omitted from description here. Further, in a case where use of the flash device is not required, the flow of operation proceeds from the step S117 to the switch-state detecting step S102, and a series of photo-taking actions comes to an end.

In the event of breaking of wire of the terminal "b" connected to the control circuit 125 due to some trouble or in the event of disengagement of the resistor 115 or the like, the charging completion signal is not generated at the step S123 in FIG. 11. In that event, therefore, the charging voltage of the main capacitor 114 would become excessive. To prevent such overcharging, the camera is provided with the high-voltage Zener diode 104. The Zener diode 104 is arranged such that, when the voltage of the main capacitor 114 rises up to a predetermined voltage level, a Zener current of the high-voltage Zener diode 104 comes to flow through the resistor 105. This current then becomes a gate current of the thyristor 110 to render the thyristor 110 conductive to cause the flash discharge tube 113 to emit light. This light emission continues until the count of the charging timer comes to an end at the step S124. These circuit elements thus constitute a safety circuit which effectively prevents an overvoltage from being applied to the main capacitor 114 for a long period of time.

The second embodiment is arranged, as described above, to variably set the charging completion voltage at a first voltage level according to changes taking place in temperature, and to set the first voltage level at a level lower than a safety operating voltage. Therefore, the arrangement of the second embodiment gives a safety system which is capable of ensuring a high degree of safety against overcharging. Further, since an oscillating action is brought to an end after the lapse of the count time set at the charging timer, the process of charging never uselessly continues.

Figure 13:
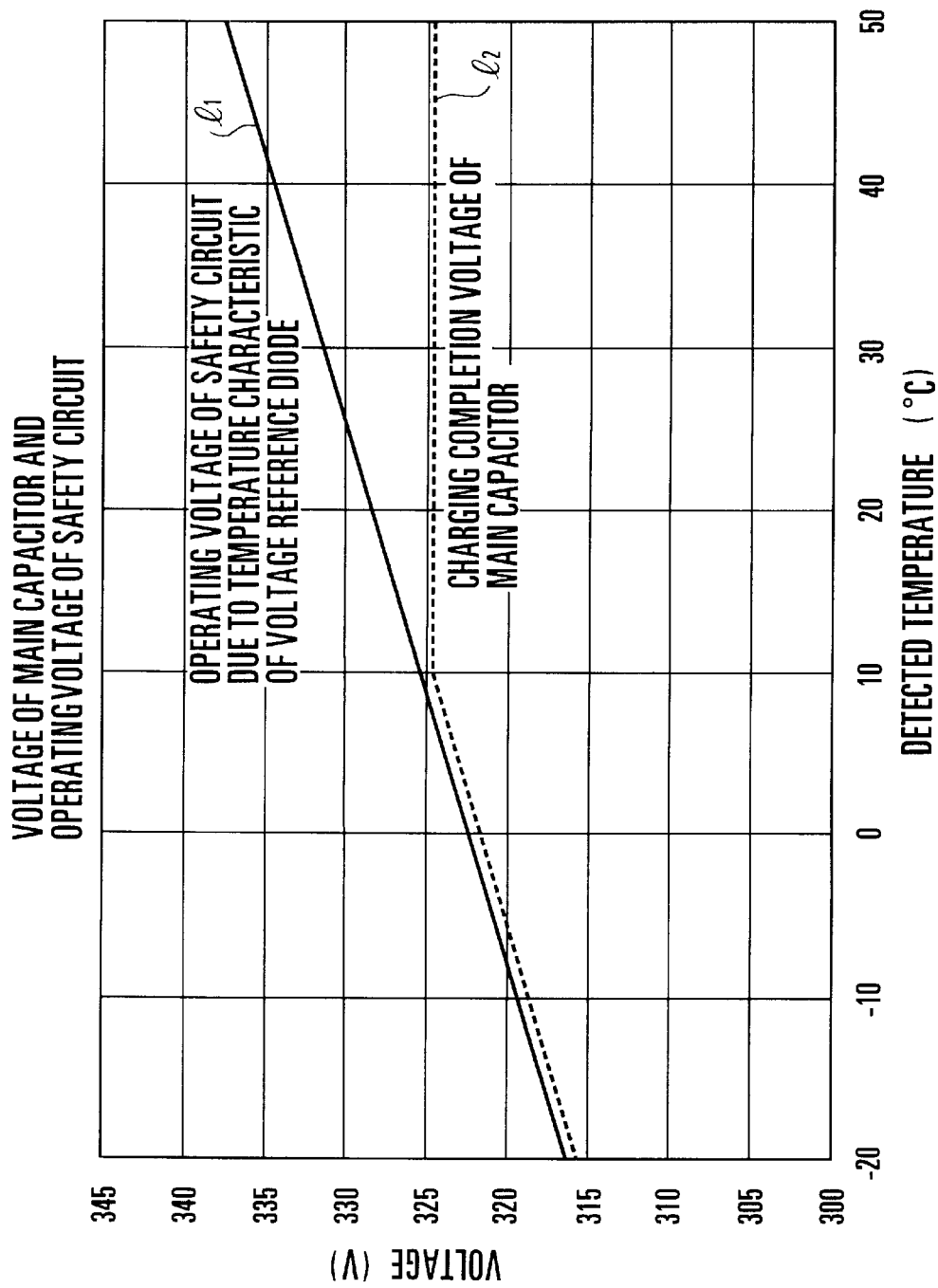
FIG. 13 is a graph showing a relation between the charging voltage of a main capacitor and the operating voltage of a safety circuit in a flash device according to a third embodiment of the invention.

A third embodiment of the invention is next described with reference to FIG. 13. FIG. 13 shows a relation between the charging voltage of the main capacitor and the operating voltage of the safety circuit in a flash device according to the third embodiment.

The second embodiment described above is arranged to set the charging completion voltage according to the temperature characteristic of the safety circuit. In the case of the third embodiment shown in FIG. 13, the charging completion voltage is arranged to be constant at temperature above a predetermined temperature of, for example, 10° C. and to be set according to the temperature characteristic of the safety circuit only at temperature below the predetermined temperature.

Generally, temperature above 10° C. can be considered to be ordinary temperature.

A fourth embodiment of the invention is described below with reference to FIG. 14. FIG. 14 shows a relation between the charging voltage of the main capacitor and the operating voltage of the safety circuit in a flash device according to the fourth embodiment.

In the case of the fourth embodiment, to cope with the temperature characteristic, the charging completion voltage is arranged to be shiftable, for example, by three steps for each of different temperature ranges of −20 to 0° C., 0 to 15° C., and above 15° C. The charging completion voltage is thus arranged to be variably set stepwise to remain constant at each of these temperature ranges.

Generally, temperature degrees within each of temperature ranges from 0 to −20° C. and above 15° C. can be regarded as belonging to one and the same temperature zone in operation.

A fifth embodiment of the invention is described below with reference to FIG. 15. FIG. 15 shows a relation between the charging voltage of the main capacitor and the operating voltage of the safety circuit in a flash device according to the fifth embodiment.

In the case of the fifth embodiment, the charging completion voltage of the main capacitor is arranged to be shiftably set for a temperature range of above a predetermined temperature of, for example, 10° C. and for another temperature range of below the predetermined temperature.

In each of FIGS. 12 to 15 which show the second to fifth embodiments of the invention, a ROM table is used for correction of the charging completion voltage against temperature.

According to the program used for the second embodiment, the charging process is brought to a stop at the charging completion voltage by stopping the DC/DC converter 102 from operating with the signal of the terminal "a" brought to a stop. However, this program may be replaced with a program whereby the DC/DC converter 102 is allowed to intermittently operate (ON-OFF-ON-OFF) in such a way as to maintain a certain voltage.

The disclosed arrangement for variably setting the charging completion voltage according to temperature may be changed to vary the charging completion voltage by making reference to a table included in a program. It is also possible to obtain a correction value by means of a writable non-volatile storage such as an EEPROM instead of the ROM.

Each of the third, fourth and fifth embodiments is arranged to vary the charging completion voltage in a stepwise manner. In this case, the arrangement for making comparison by means of the A/D converter may be changed to a method of using a plurality of comparison circuits by switching the use of them from one over to another according to temperature.

In each of the fourth and fifth embodiments shown in FIGS. 14 and 15, the use of the A/D converter in setting stepwise the charging completion voltage may be changed to a method whereby reference voltages are provided for a detecting circuit including a comparator and used by switching them from one over to another for a predetermined temperature range.

Further, while the second embodiment is arranged to vary the charging completion voltage according to temperature, that arrangement may be changed to vary the operating voltage of the safety circuit according to temperature and to set it at a voltage higher than the charging completion voltage. Such modification can be considered to be another embodiment of the invention.

We claim:

1. An electronic flash device having a flash discharge tube, a main capacitor which supplies light emission energy to said flash discharge tube, boosting means for performing a charging action onto said main capacitor by performing a boosting action, detecting means for detecting a charging voltage of said main capacitor, and a restraining circuit which restrains the charging action from being performed when said detecting means detects that the charging voltage has become not less than a predetermined voltage, said electronic flash device comprising:

a series circuit provided in parallel with said main capacitor and composed of a voltage reference diode and a thermo-sensitive device having a negative temperature characteristic; and discharge means for discharging said main capacitor when said main capacitor has been charged up to a voltage defined by said series circuit.

2. An electronic flash device according to claim 1, wherein said thermo-sensitive device is a thermistor of negative characteristic.

3. An electronic flash device according to claim 1, wherein the voltage defined by said series circuit is greater than a charging completion voltage available for flash light emission and is less than a rated voltage of said main capacitor.

4. An electronic flash device having a flash discharge tube, a main capacitor which supplies light emission energy to said flash discharge tube, boosting means for performing a charging action onto said main a capacitor by performing a boosting action, detecting means for detecting a charging voltage of said main capacitor, and a restraining circuit which restrains the charging action from being performed when said detecting means detects that the charging voltage has become not less than a predetermined voltage, said electronic flash device comprising:

a series circuit provided in parallel with said main capacitor and composed of a voltage reference diode and a thermo-sensitive device having a negative temperature characteristic; and a switching element a gate of which is connected to an anode side of said voltage reference diode, said switching element becoming operative to perform a triggering action on said flash discharge tube when a current flowing in said series circuit has reached a predetermined value.

5. An electronic flash device according to claim 4, wherein said switching element is a thyristor.

6. An electronic flash device according to claim 4, wherein said thermo-sensitive device is a thermistor of negative characteristic.

7. An electronic flash device according to claim 4, wherein said switching element becomes operative when the voltage of said main capacitor has become a predetermined voltage which is greater than a charging completion voltage available for flash light emission and less than a rated voltage of said main capacitor.

8. An electronic flash system having a flash discharge tube, a main capacitor which supplies light emission energy to said flash discharge tube, boosting means for performing a charging action onto said main capacitor by performing a boosting action, detecting means for detecting a charging voltage of said main capacitor, and a restraining circuit which restrains the charging action from being performed when said detecting means detects that the charging voltage has become not less than a predetermined voltage, said electronic flash system comprising:

a series circuit provided in parallel with said main capacitor and composed of a voltage reference diode and a thermo-sensitive device having a negative temperature characteristic; and discharge means for discharging said main capacitor when said main capacitor has been charged up to a voltage defined by said series circuit.

9. An electronic flash system according to claim 8, wherein said thermo-sensitive device is a thermistor of negative characteristic.

10. An electronic flash system according to claim 8, wherein the voltage defined by said series circuit is greater than a charging completion voltage available for flash light emission and is less than a rated voltage of said main capacitor.

11. An electronic flash system having a flash discharge tube, a main capacitor which supplies light emission energy to said flash discharge tube, boosting means for performing a charging action onto said main capacitor by performing a boosting action, detecting means for detecting a charging voltage of said main capacitor, and a restraining circuit which restrains the charging action from being performed when said detecting means detects that the charging voltage has become not less than a predetermined voltage, said electronic flash system comprising:

a series circuit provided in parallel with said main capacitor and composed of a voltage reference diode and a thermo-sensitive device having a negative temperature characteristic; and a switching element a gate of which is connected to an anode side of said voltage reference diode, said switching element becoming operative to perform a triggering action on said flash discharge tube when a current flowing in said series circuit has reached a predetermined value.

12. An electronic flash system according to claim 11, wherein said switching element is a thyristor.

13. An electronic flash system according to claim 11, wherein said thermo-sensitive device is a thermistor of negative characteristic.

14. An electronic flash system according to claim 11, wherein said switching element becomes operative when the voltage of said main capacitor has become a predetermined voltage which is greater than a charging completion voltage available for flash light emission and less than a rated voltage of said main capacitor.

15. A flash device having a boosting circuit which boosts a battery voltage, a main capacitor which is charged by an output of said boosting circuit, a restraining circuit which restrains a charging action on said main capacitor when a charging voltage of said main capacitor has reached a first voltage, and a safety circuit which prevents overcharging onto said main capacitor when the charging voltage of said main capacitor has reached a second voltage, said second voltage, at which said safety circuit works, being arranged to change according to temperature, said flash device comprising:

- a temperature detecting circuit; and
- a setting circuit which sets said first voltage to a voltage lower than said second voltage according to the temperature detected by said temperature detecting circuit.

16. A flash device according to claim 15, wherein said safety circuit includes discharge means for discharging said main capacitor.

17. A flash device according to claim 15, further comprising a voltage detecting circuit which detects whether the charging voltage of said main capacitor has reached the second voltage, said voltage detecting circuit has a temperature characteristic.

18. A flash device according to claim 16, wherein said discharge means is a flash discharge tube.

19. A flash device having a boosting circuit which boosts a battery voltage, a main capacitor which is charged by an output of said boosting circuit, a restraining circuit which restrains a charging action on said main capacitor when a charging voltage of said main capacitor has reached a first voltage, and a safety circuit which prevents overcharging onto said main capacitor when the charging voltage of said main capacitor has reached a second voltage, said flash device comprising:

- a temperature detecting circuit; and
- a setting circuit which sets said second voltage according to temperature detected by said temperature detecting circuit to prevent said second voltage from becoming lower than said first voltage even if the temperature changes.

20. A flash photographing system having a boosting circuit which boosts a battery voltage, a main capacitor which is charged by an output of said boosting circuit, a restraining circuit which restrains a charging action on said main capacitor when a charging voltage of said main capacitor has reached a first voltage, and a safety circuit which prevents overcharging onto said main capacitor when the charging voltage of said main capacitor has reached a second voltage, said second voltage, at which said safety circuit works, being arranged to change according to temperature, said flash photographing system comprising:

- a temperature detecting circuit; and
- a setting circuit which sets said first voltage to a voltage lower than said second voltage according to the temperature detected by said temperature detecting circuit.

21. A flash photographing system according to claim 20, wherein said safety circuit includes discharge means for discharging said main capacitor.

22. A flash photographing system having a boosting circuit which boosts a battery voltage, a main capacitor which is charged by an output of said boosting circuit, a restraining circuit which restrains a charging action on said main capacitor when a charging voltage of said main capacitor has reached a first voltage, and a safety circuit which prevents overcharging onto said main capacitor when the charging voltage of said main capacitor has reached a second voltage, said flash photographing system comprising:

- a temperature detecting circuit; and
- a setting circuit which sets said second voltage according to temperature detected by said temperature detecting circuit so as to prevent said second voltage from becoming lower than said first voltage even if the temperature changes.

* * * * *

UNITED STATES PATENT AND TRADEMARK OFFICE
CERTIFICATE OF CORRECTION

PATENT NO. : 6,061,528
DATED : May 9, 2000
INVENTOR(S) : Yoshiro Ichihara, et al.

It is certified that error appears in the above-identified patent and that said Letters Patent are hereby corrected as shown below:

Col. 9, line 26, after "(K)" insert -- . --.
Col. 11, line 8, delete "camrera" and insert -- camera --.
Col. 12, line 50, delete "s et" and insert -- set --.
Col. 13, line 9, delete "t he" and insert -- the --.

Signed and Sealed this

Twenty-second Day of May, 2001

*Attest:*

NICHOLAS P. GODICI

*Attesting Officer*  Acting Director of the United States Patent and Trademark Office